(12) United States Patent
Scott

(10) Patent No.: US 11,551,020 B2
(45) Date of Patent: Jan. 10, 2023

(54) INTELLIGENT ASSET MANAGEMENT

(71) Applicant: NCR Corporation, Atlanta, GA (US)

(72) Inventor: Micah Scott, Fayetteville, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/230,573

(22) Filed: Apr. 14, 2021

(65) Prior Publication Data

US 2022/0335238 A1    Oct. 20, 2022

(51) Int. Cl.
*G06K 7/14* (2006.01)
*G06Q 20/10* (2012.01)
*G06K 19/06* (2006.01)

(52) U.S. Cl.
CPC ......... *G06K 7/1413* (2013.01); *G06K 7/1417* (2013.01); *G06K 19/06028* (2013.01); *G06K 19/06037* (2013.01); *G06Q 20/1085* (2013.01)

(58) Field of Classification Search
CPC ............... G06K 7/1413; G06K 7/1417; G06K 19/06028; G06K 19/06037
See application file for complete search history.

(56) References Cited

U.S. PATENT DOCUMENTS

2019/0180067 A1\* 6/2019 Sun ...................... G06K 7/1417

\* cited by examiner

*Primary Examiner* — Jamara A Franklin
(74) *Attorney, Agent, or Firm* — Schwegman, Lundberg & Woessner

(57) ABSTRACT

A code associated with a managed device is scanned by a mobile device operated by service personnel. The code at least comprises an identifier for managed device. A current geographical location of the mobile device and the code are provided to a cloud/server. The location is associated with the managed device and updated or added to a shared private blockchain ledger. The shared private blockchain ledger shared between one or more enterprises and one or more service organizations. In an embodiment, the managed device dynamically generates the code and presents the code on a display associated with the managed device for scanning by the mobile device.

13 Claims, 3 Drawing Sheets

INTELLIGENT ASSET MANAGEMENT

BACKGROUND

Invoicing and asset management are current areas of pain for customers, enterprises, and support organizations. Asset management for support services is a critical concern, particularly with respect to invoicing for support services.

Device connectivity has become omnipresent; today, even devices considered to be largely unintelligent have processors and network capabilities. In fact, technology advanced so quickly that many enterprises did not plan and maintain the proper software systems to effectively track and manage their assets (devices and software on the devices). Struggling to keep up with normal business activities while at the same time continuously trying to update their software resources, some enterprises have completely lost track as to the physical location of their devices and the software resources on each of their devices. Large scale updates to the devices with up-to-date software for purposes of asset management is infeasible for many enterprises.

The problem is even more acute for third-party service organizations that have been tasked with servicing assets on behalf of the enterprises. The service organizations cannot effectively perform updates, maintenance, and support on devices for which the contracting enterprises themselves do not have up-to-date information on the devices' locations and each device's current software configuration. Any large-scale attempt by a service organization to track down an enterprise's devices and each device's configuration quickly becomes out of date when business practices of the enterprise permit freely moving the devices around and installing new software on the devices.

Furthermore, some enterprises, such as banks have to maintain secure networks to their Automated Teller Machines (ATMs). Banks are reluctant and government regulations may prohibit providing third-party service organizations network access to the ATMs. This means the service organization can only service the ATMs by physically being present at the ATMs, which is problematic when the banks freely move the ATMs from branch to branch and the banks are not up to date on the current locations of the ATMs.

In short, enterprises struggle with maintaining an accurate evergreen listing of their assets, which can be under contract for service with third-party organizations. This makes invoicing by the service organizations difficult when invoices submitted to the enterprises require asset location information for devices serviced and the serviced devices have already been relocated by the enterprises to new locations. Moreover, lack of evergreen listings makes timely service of the assets a significant challenge for the service organizations.

SUMMARY

In various embodiments, methods and a system for intelligent asset management are presented.

According to an embodiment, a method for intelligent asset management is presented. A service communication is received from a mobile device. A managed device identifier for a managed device and a current geographical location of the managed device of the mobile device are identified from the service communication. The managed device identifier is associated with or linked to the managed device identifier. A ledger associated with servicing the managed device is updated with the current geographical location within a private blockchain based on rules associated with the managed device identifier.

DETAILED DESCRIPTION

Figure 1:
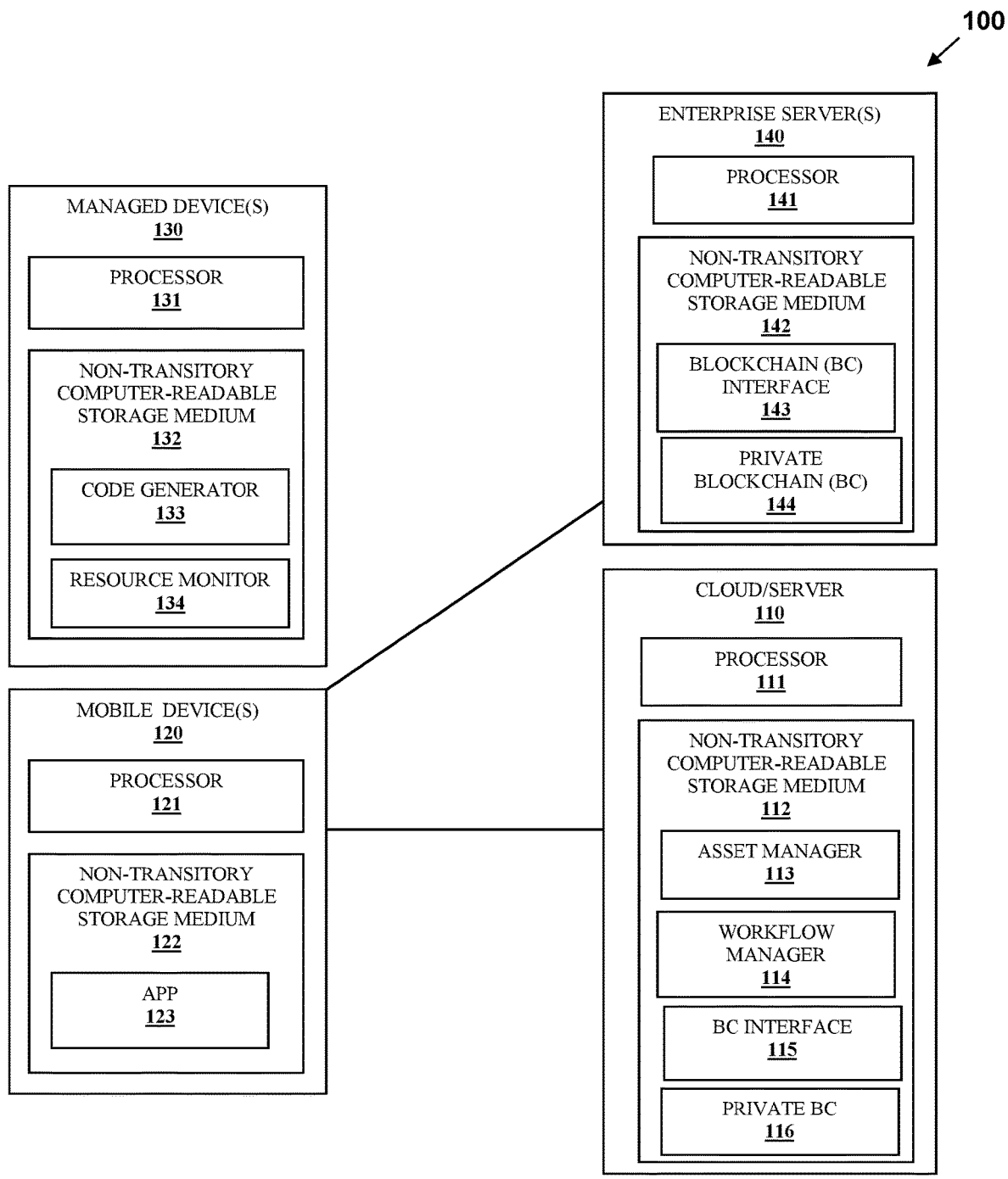
FIG. 1 is a diagram of a system for intelligent asset management, according to an example embodiment.

FIG. 1 is a diagram of a system 100 for intelligent asset management, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of intelligent asset management, presented herein and below.

As will be demonstrated herein, system 100 provides techniques for intelligent asset management. A code for an asset is scanned by a mobile device of a service engineer or user. The code at least comprises an asset number for the asset. The current location of the mobile device is associated with asset number and updated to a distributed ledger managed through a private blockchain. Enterprises and service organizations can access the association between the current location and the asset number via a shared distributed private blockchain for up to date geolocation information of the asset. Moreover, the association can be injected into workflows of service organization and/or enterprises for automated asset management when the current location reflects a change from a previously recorded asset location for the asset.

In some embodiments, the managed device (one type of asset) may generate the code so as to include its asset number and its current software (another type of asset) inventory and configuration.

In an embodiment, the managed device may also additionally include its current geographical location within the code (assuming the managed device includes some form of location services). The software inventory and configuration can be linked within the private blockchain to the asset number for the asset and to the current location of the asset. The software inventory and configuration may also be injected into workflows for automated processing by the service organization and/or the enterprises.

It is to be noted that system 100 and the techniques discussed herein and below for intelligent asset management can be practiced without the managed device having a network connection or without the managed device having network access. That is, the techniques are independent of any network connectivity of the managed device and are independent of any required network access to the managed device.

As used herein an "asset" includes hardware and software resources of a managed device. A "managed device" is a device that is to be managed by or on behalf of an enterprise. A managed device may or may not include a variety of interfaced peripheral devices (e.g., depository, recycler, touch display, card reader, printer, keyboard, encrypted Personal Identification Number (PIN) pad, Near Field Communication (NFC) transceiver, Radio Frequency (RF) wireless transceivers, scanner, camera, microphone, speaker, etc.).

The terms and phrases "user," "operator," "customer engineer," "service engineer," and "engineer" may be used synonymously and interchangeably herein. This refers to a support person who is physically present or proximate to a managed device and is relocating and initiating the managed device or is performing service or diagnostics on the managed device. The support person also operates and carries a mobile device while present at the managed device.

The techniques of system 100 can be performed and implemented in a variety of embodiments, which are presented herein and below.

System 100 comprises a cloud/server 110, a plurality of mobile devices 120, a plurality of managed devices 130, and a plurality of enterprise servers 140.

Cloud/server 110 comprises a processor 111 and a non-transitory computer-readable storage medium 112. Medium 112 comprises executable instructions for an asset manager 113, a workflow manager 114, and private blockchain (BC) interface 115. When the executable instructions are provided to and executed by processor 111, this causes processor 111 to perform operations discussed herein and below with respect to 113-115. Medium 112 also comprises storage housing a portion of a shared private BC 116.

Each mobile device 120 comprises a processor 121 and a non-transitory computer-readable storage medium 122. Medium 122 comprises executable instructions for a mobile application (herein after just "app") 123. When the executable instructions are provided to and executed by processor 121, this causes processor 121 to perform operations discussed herein and below with respect to app 123. Each mobile device 120 also comprises an integrated camera (not shown in FIG. 1).

Each managed device 130 (herein after just "device 130") comprises at least one processor 131 and a non-transitory computer-readable storage medium 132. Medium 132 comprises executable instructions for a code generator 133 and a resource monitor 134. When the executable instructions are provided to and executed by processor 131, this causes processor 131 to perform operations discussed herein and below with code generator 133 and resource monitor 134.

Each enterprise server 140 comprises a processor 141 and a non-transitory computer-readable storage medium 142. Medium 142 comprises executable instructions for a BC interface 143. When the executable instructions are provided to and executed by processor 141, this causes processor 141 to perform operations discussed herein and below with respect to BC interface 143. Medium 142 also comprises storage housing a portion of a BC 144.

The managed information for a given managed device 130 is housed and managed from BC 116 and 144. That is, component entries identifying up to date asset numbers for managed devices 130 along with each device's current geographical location, current resource installed configuration, current interfaced peripherals, and service records are updated and retrieved from the BC 116 and 144. Each asset comprises its own set of entries that form that asset's ledger, the entries are managed and distributed over the BC 116 and 144 and retrieved based on public-private key pairs and/or hash values associated with enterprises, third-party service organizations, and asset identifiers or numbers. Each participating party (enterprise and service organization) is assigned public-private key pairs through BC interface 143 and 115 and can insert, update, retrieve, and track a given asset's ledger using the keys and the corresponding asset keys via BC interface 143 and 115. This provides an up to date audit trail for a given asset and its managed information along with security since only authorized participants can access the BC 144 and 116 via public-private key pairs (private keys are never transmitted from servers 140 or cloud/server 110 such that they are inaccessible to processing environments that are not native to servers 140 and cloud/server 110).

During operation of system 100, a service engineer is dispatched to managed device 130 to perform some service (this can include relocating or setting the device 130 up for a first time following a move of device 130), maintenance, media replenishment of media on device 130, and/or diagnostic operation on managed device 130. An existing workflow may have triggered the dispatch of service engineer to managed device 130 (such as a service ticket, relocating device 130, initiating device 130 for a first time, regularly scheduled maintenance, media replenishment, etc.).

It is also to be noted that the service engineer may be employed and dispatched as an employee of an enterprise associated with enterprise server 140 or may be contracted or employed and dispatched by a third-party service organization associated with cloud/server 110.

The service engineer either scans (using a camera integrated within or an externally interfaced scanner interfaced to mobile device 120 within app 123) an existing code printed on a label and affixed to managed device 130 or activates an option through an interface of managed device 130 to cause code generator 133 to generate and display a dynamically rendered code on a display associated with managed device 130 where the dynamically rendered code is scanned by a camera of mobile device 120 within app 123.

App 123 uses location services of mobile device 120 to obtain a geographical location of mobile device 120, and app 123 sends a device identifier for mobile device 120, the geographical location of mobile device 120, and the scanned code from managed device 130 to asset manager 113.

Asset manager 113 determines from the device identifier for mobile device 120 a service engineer identifier for the service engineer that operates mobile device 120. A managed device identifier for managed device 130 is obtained from the code by asset manager 113. Asset manager 113 obtains an enterprise identifier for an enterprise associated with managed device 130 based on the managed device identifier. The geographical location for mobile device 120 is translated into a known address associated with the enterprise using the enterprise identifier by asset manager 113.

A workflow is obtained by asset manager 113 based on the enterprise identifier and managed device identifier. The retrieved workflow includes rules that are evaluated by workflow manager 114 for purposes of determining conditions by which a ledger associated with managed device 130 is to be updated within the BC 116 based on receipt of the geographical location of mobile device 120 and the code along with the workflow. The rules may indicate that the ledger for managed device 130 is to always be updated based on access of the service engineer to managed device 120, may indicate that a specific individual has to provide permission for updating the ledger, or may indicate that the ledger is to be updated only based on an activity identifier associated with an activity that the service engineer is performing on managed device 130 (the activity identifier may be retrieved from the workflow).

When asset manager 113 determines that the ledger for managed device 130 is to be updated and any needed permission is obtained, asset manager 113 provides the enterprise identifier, enterprise address where managed device 130 is located (based on the reported geographical location of mobile device 120), the service engineer identifier for the service engineer, and, optionally, any service notes or service actions taken by service engineer while servicing managed device 130 (provided via app 123) to BC interface 115. BC interface 115 obtains the appropriate keys and hashes for managed device 130 and injects the above-referenced information into the BC 116 and 144 to update/add entries associated with manage device 130 distributed ledger.

At any time should an employee of a service organization or of an enterprise desire to obtain the distributed ledger for a given managed device 130 that the service organization or the enterprise is authorized via private-public key pairs to access, the service organization or enterprise uses BC interface 115 or BC interface 143 and provides the managed device identifier. BC interface 115 or BC interface 143 generates the appropriate keys and hash values for the service organization or enterprise and the managed device 130 and injects the request into BC 116 and 144. This causes entries associated with the distributed ledger of managed device 130 to be retrieved and assembled and provided through BC interface 115 or 143 to the employee of the service organization or of the enterprise. In this way, an up to date and accurate set of managed information for managed device 130 is accessible to both the service organization and the enterprise.

Also, each time an entry is updated or added to a distributed ledger for a managed device 130 within BC 116 a current calendar date and current time of day is provided with the entry. This ensures that each entry is date and time stamped for auditing.

It is to be noted that the technique for managing the distributed ledger of managed device 130 did not require managed device 130 to have a network connection to cloud/server 110 or to enterprise server 140. Moreover, the only manual action required to update or to add to the distributed ledger was a scan of a code by the service engineer via app 123 all other processing is completely automated and secure.

A variety of embodiments or variations on the above-discussed processing can occur.

For example, and in an embodiment, code generator 133 generates the code dynamically and presents the code on a display interfaced to managed device 130.

In an embodiment, code generator 133 processes a resource monitor on managed device 130. Resource monitor 134 maintains an up to date software resource configuration that identifies software modules and versions of those software modules installed on managed device 130. Resource monitor 134 may also maintain peripheral identifiers for peripherals interfaced to managed device 130. Resource monitor 134 may also maintain a current state or a current health of managed device 130, such as media levels (currency levels, ink levels, receipt printer paper levels, etc.), backup power level, network connectivity status, etc. Code generator 133 encodes the software resource configuration, peripheral identifiers, and/or current health of managed device 130 within a generated code that is then displayed on the display for the service engineer to scan via mobile device 120 using app 123. The code generated may be a Quick Response (QR) code that is encoded by code generator 133 with the software configuration, connected peripherals, and health dynamically at a time when the service engineer makes a request to display the code on a display interfaced to managed device 130. The code is dynamically generated, and changes based on the maintained software configuration, connected peripherals, and health recorded on changes by resource monitor 134.

In an embodiment, code generator 133 also encodes a current geographical location of managed device 130, which is obtained from an integrated Global Positioning Satellite (GPS) receiver of managed device 130 or which is obtained via location services available on managed device 130. In this embodiment, the current location of mobile device 120 may be used by asset manager 113 to ensure that the two agree and are not reporting different geographical locations or ensure that the two geographically reported locations (the one for managed device 130 encoded in the code and the one reported by app 123 for mobile device 120) are within a threshold distance of one another (e.g., within a few feet). This adds security checks, maintains controls, and reduces failure points.

In an embodiment, the workflow associated with the enterprise, the managed device 130, the service engineer, and/or the service organization may add an entry to the distributed ledger each time the service engineer provides the code scanned at managed device 130.

In an embodiment, the workflow associated with the enterprise, the managed device 130, the service engineer, and/or the service organization may instruct via the rules that asset manager 113 determine using BC interface 115 a most-recent or last-updated location for the managed device 130 from the BC 116 and 144 and when the current reported location matches the most-recent or last-updated location for managed device 130, asset manager 113 does not adjust the location on the distributed ledger for the managed device 130. That is, the distributed ledger for managed device 130 may only be used as a shared ledger to identify the current location of managed device 130 by the enterprise and/or service organization.

In an embodiment, the workflow may instruct via the rules that asset manager 113 always update or add the current location, current software resource configuration, peripheral identifiers, and/or health of managed device 130 each time mobile device 120 provides a code via app 123. The distributed ledger for managed device 130 provides an up to date assessment of the managed device's current location, software installation, connected peripherals, and health.

In an embodiment, the workflow may instruct via the rules that a specific geographical location for managed device 130 be retrieved by asset manager 113 from the BC 116 based on a specific date and time and fed to an invoicing system or an invoicing workflow.

In an embodiment, the workflow may instruct via the rules that asset manager 113 obtain service notes and service activity records from a management system associated with the visit of the service engineer to managed device 130 and provide those notes or activity records as additional entries into the distributed ledger for managed device 130 via BC interface 115. Here, rules of the workflow may instruct asset manager 113 to set a trigger on the management system for an open service record and when the service record is closed, obtain the notes and records from the management system and update them to the distributed ledger for managed device 130.

In an embodiment, employees of an enterprise associated with a given enterprise server 140 are provided app 123 for installation and processing on their mobile devices 120. Here, enterprise 140 may perform some of its own service, relocation, and/or installation on managed device 130 using its own workflows. However, app 123 allows asset manager 113 to at least maintain in the distributed ledger for managed device 130 an up to date current geographical location for managed device 130 along with, optionally, the current software configuration, the current connected peripheral devices, and/or the current health of managed device 130.

In an embodiment, managed device 130 is an ATM, a Self-Service Terminal (SST), a Point-Of-Sale (POS) terminal, a server, a desktop, or a device that is part of the Internet-of-Things (IoT).

In an embodiment, mobile device 120 is a tablet, a phone, a laptop, or a wearable processing device.

In an embodiment, the code is a QR code, a barcode, or an image of text that comprises at least a device identifier for managed device 130.

In an embodiment, the processing of app 123 is integrated into and provided through an enhanced version of an existing mobile asset management app as an added feature to maintain the distributed ledgers for managed devices 130 over BC 116.

In an embodiment, asset manager 113 and workflow manager 114 are provided via a given enterprise server 140.

In an embodiment, the code is scanned by an employee of the enterprise or by a customer of the service organization while the employee or customer operates mobile device 120. The image of the code or the code itself may be captured by a camera of mobile device 120 or by an external scanner interfaced to mobile device 120 (note the scanner may be able to read the code such that the information included in the code may be provided as text information directly from app 123 to asset manager 113). The workflow associated with providing the code may be for reporting a help desk ticket to the service organization and the code may provide the health or state of the managed device 140 (code may also include software and peripheral information as discussed above) before a customer engineer is dispatched to managed device 140 or to determine whether a customer engineer needs to be dispatched at all to managed device 140.

System 100 provides a mechanism by which enterprises and their service organizations can maintain up to date geolocations and, optionally, software configurations, connected peripherals, and/or device health for their managed devices 130. The up to date information is maintained via a private BC 116 and 144, which is managed and updated by both the enterprise and their service organizations. Rules and workflows can dictate what types of information can be additionally stored in the distributed ledgers, when information is updated to the distributed ledgers, when information is not updated to the distributed ledgers, who is authorized to update the information to the distributed ledgers, and what automated processing actions are taken by systems of the enterprises and their service organizations. Furthermore, system 100 can be easily integrated into existing workflows and systems with very little integration effort required and existing workflows and existing systems can remain unmodified.

The above-noted embodiments and other embodiments are now discussed with reference to FIGS. 2-3.

Figure 2:
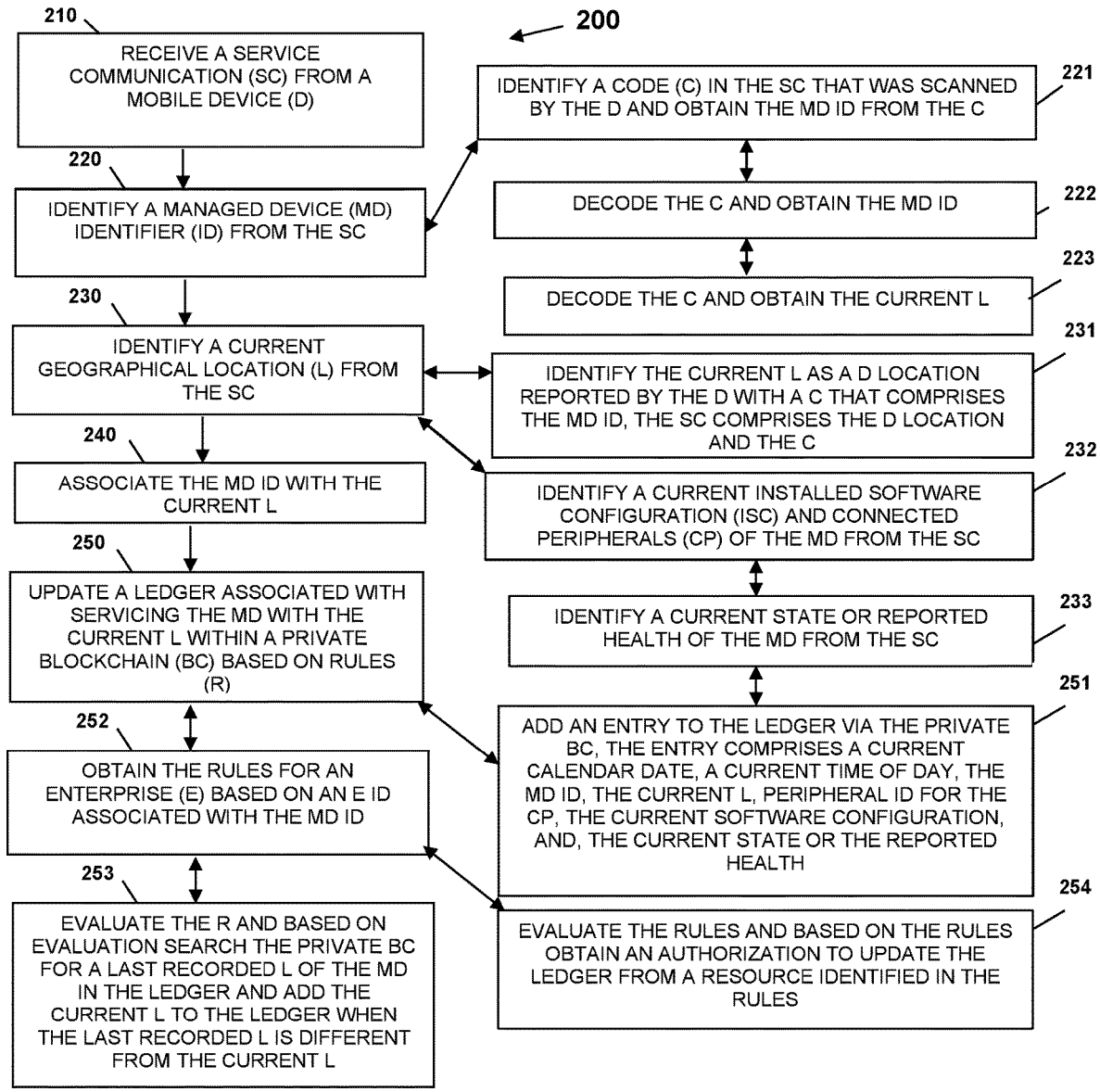
FIG. 2 is a diagram of a method for intelligent asset management, according to an example embodiment.

FIG. 2 is a diagram of a method 200 for intelligent asset management, according to an example embodiment. The software module(s) that implements the method 200 is referred to as an "asset-location manager." The asset-location manager is implemented as executable instructions programmed and residing within memory and/or a non-transitory computer-readable (processor-readable) storage medium and executed by one or more processors of a device or set of devices. The processor(s) of the device(s) that executes the server connection asset-location manager are specifically configured and programmed to process the asset-location manager. The asset-location manager may have access to one or more network connections during its processing. The network connections can be wired, wireless, or a combination of wired and wireless.

In an embodiment, the asset-location manager executes on cloud 110.

In an embodiment, the asset-location manager executes on server 110.

In an embodiment, the asset-location manager executes on enterprise server 140.

In an embodiment, the asset-location manager is all or some combination of asset manager 113, workflow manager 114, BC interface 115, and/or BC interface 144.

At 210, asset-location manager receives a service communication from a mobile device 120 when a code is scanned associated with a managed device 130. The code may be affixed as a label that is scanned and provided to the asset-location manager via mobile app 123 or the code may be presented on a display of the managed device 130.

At 220, the asset-location manager identifies a managed device identifier for the managed device 130 from the service communication.

In an embodiment, at 221, the asset-location manager identifies the code in the service communication. Again, the code is scanned and provided by the mobile device 130. The asset-location manager obtains the managed device identifier from the code.

In an embodiment of 221 and at 222, the asset-location manager decodes the code and obtains the managed device identifier for the managed device.

In an embodiment of 222 and at 223, the asset-location manager decodes the code and obtains the current geographical location of the managed device. In this embodiment, the code generator 133 dynamically generates and renders the managed device's geographical location within the code on a display of the managed device 130.

At 230, the asset-location manager identifies a current geographical location from the service communication. The current geographical location may be reported from mobile device 120 or obtained via the dynamically rendered code from the managed device 130.

In an embodiment, at 231, the asset-location manager identifies the current geographical location as a mobile device location reported by the mobile device 120 with the code that comprises the managed device identifier. The service communication comprises the mobile device location and the code.

In an embodiment, at 232, the asset-location manager identifies a current installed software configuration and connected peripherals of the managed device from the service communication.

In an embodiment of 232 and at 233, the asset-location manager identifies a current state or reported health of the managed device from the service communication.

At 240, the asset-location manager associates or links the managed device identifier with the current geographical location.

At 250, the asset-location manager updates a ledger associated with servicing the managed device with the current geographical location within a private BC 116 and 144.

In an embodiment of 233 and 250, at 251, the asset-location manager adds an entry to the ledger via the private BC. The entry comprises a current calendar date, a current time of day, the managed device identifier, the current geographical location, peripheral identifiers for the connected peripherals, the current software configuration, and the current state or the reported health of the managed device.

In an embodiment, at 252, the asset-location manager obtains the rules for an enterprise based on an enterprise identifier associated with the managed device identifier.

In an embodiment of 252 and at 253, the asset-location manager evaluates the rules and based on the evaluation searches the private BC for a last recorded geographical location of the managed device in the ledger. The asset-location manager adds the current geographical location to the ledger when the last recorded geographical location is different from the current geographical location, which was identified at 230.

In an embodiment of 252 and at 254, the asset-location manager evaluates the rules and based on the rules obtains an authorization to update the ledger from a resource identified within the rules or within a workflow associated with the managed device identifier.

Figure 3:
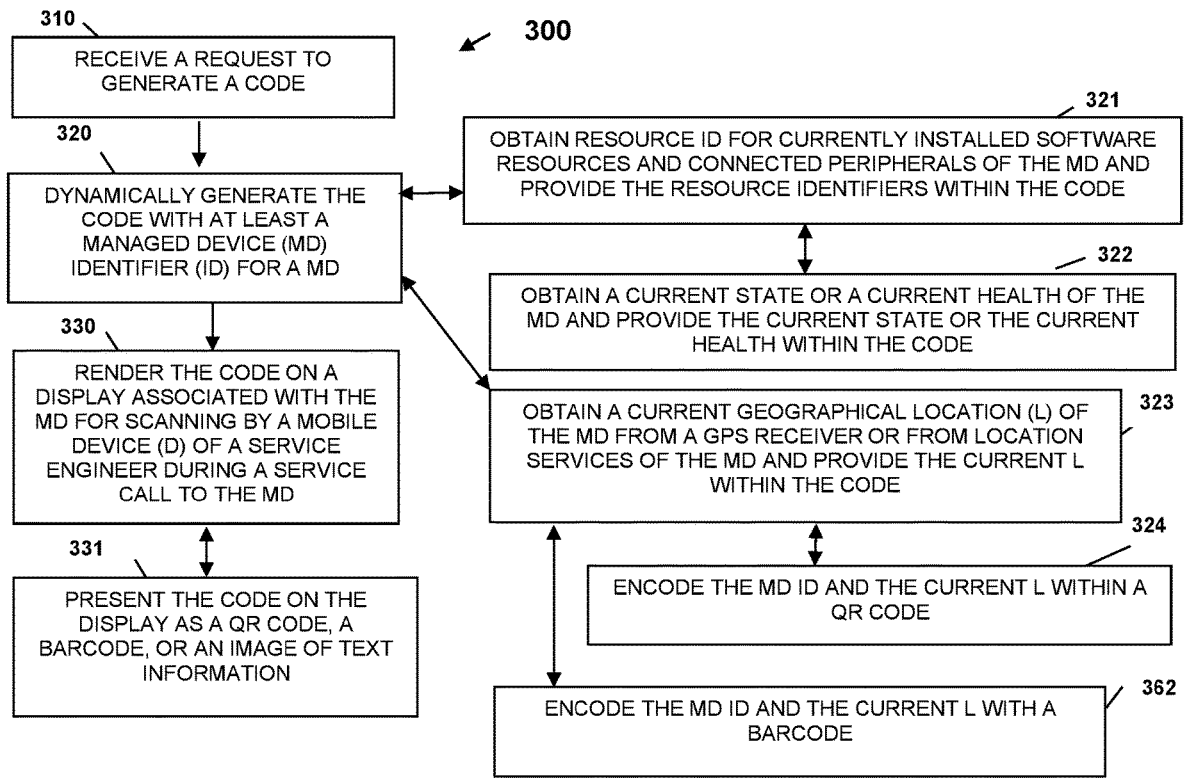
FIG. 3 is a diagram of another method for intelligent asset management, according to an example embodiment

FIG. 3 is a diagram of another method 300 for intelligent asset management, according to an example embodiment. The software module(s) that implements the method 300 is referred to as a "managed device dynamic code generator." The managed device dynamic code generator is implemented as executable instructions programmed and residing within memory and/or a non-transitory computer-readable (processor-readable) storage medium and executed by one or more processors of a device or set of devices. The processor(s) of the device that executes the managed device dynamic code generator are specifically configured and programmed to process the managed device dynamic code generator. The managed device dynamic code generator may have access to one or more network connections during its processing. The network connections can be wired, wireless, or a combination of wired and wireless.

In an embodiment, the device that executes the managed device dynamic code generator is managed device 130.

In an embodiment, the managed device dynamic code generator is all of, or some combination of, code generator 133 and/or resource monitor 134.

In an embodiment, managed device dynamic code generator executes on managed device 130 without network access or network connectivity to method 200, enterprise server 140, and/or cloud/server 110.

At 310, managed device dynamic code generator receives a request through a user-facing interface of a managed device to generate a service code.

At 320, the managed device dynamic code generator dynamically generates the service code with the code at least comprising a managed device identifier for the managed device.

In an embodiment, at 321, the managed device dynamic code generator obtains resource identifiers for currently installed software resources and for connected peripherals of the managed device. The managed device dynamic code generator provides the resources identifiers within the generated code.

In an embodiment of 321 and at 322, the managed device dynamic code generator obtains a current state or a current health of the managed device and provides the current state or the current health within the generated code.

In an embodiment, at 323, the managed device dynamic code generator obtains a current geographical location of the managed device from a GPS receiver of from location services of the managed device and the managed device dynamic code generator provides the current geographical location within the generated code.

In an embodiment of 323 and at 324, the managed device dynamic code generator encodes the managed device identifier and the current geographical location of the managed device within a QR code (the code is a QR encoded).

In an embodiment of 323 and at 325, the managed device dynamic code generator encodes the managed device identifier and the current geographical location of the managed device within a barcode (the code is barcoded).

At 330, the managed device dynamic code generator renders the code on a display associated with the managed device for scanning by a mobile device of a service engineer during a service call to the managed device.

In an embodiment, at 331, the managed device dynamic code generator presents the code on the display as a QR code, a barcode, or an image of text information.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   receiving a service communication from a mobile device;
   identifying a managed device identifier for a managed device from the service communication;
   identifying a current geographical location from the service communication;
   associating the managed device identifier with the current geographical location; and
   updating a ledger associated with servicing the managed device with the current geographical location within a private blockchain based on rules.

2. The method of claim 1, wherein identifying the managed device identifier further includes identifying a code in the service communication that was scanned by the mobile device and obtaining the mobile device identifier from the code.

3. The method of claim 2, wherein identifying the code further includes decoding the code and obtaining the managed device identifier.

4. The method of claim 3, wherein identifying the current geographical location further includes decoding the code and obtaining the current geographical location.

5. The method of claim 1, wherein identifying the current geographical location further includes identifying the current geographical location as a mobile device location reported by the mobile device with a code that comprises the managed device identifier, wherein the service communication comprises the mobile device location and the code.

6. The method of claim 1, wherein identifying the current geographical location further includes identifying a current installed software configuration and connected peripherals of the managed device from the service communication.

7. The method of claim 6, wherein identifying the current geographical location further includes identifying a current state or a reported health of the managed device from the service communication.

8. The method of claim 7, wherein updating the ledger further includes adding an entry to the ledger via the private blockchain, wherein the entry comprising a current calendar date, a current time of day, the managed device identifier, the current geographical location, the current installed software configuration, peripheral identifiers for the connected peripherals, and the current state or the reported health.

9. The method of claim 1, wherein updating further includes obtaining the rules for an enterprise based on an enterprise identifier associated with the managed device identifier.

10. The method of claim 9, wherein obtaining the rules further includes evaluating the rules and based on the evaluating searching the private blockchain for a last recorded geographical location of the managed device in the ledger and adding current geographical location to the ledger when the last recorded geographical location is different from the current geographical location.

11. The method of claim 9, wherein obtaining the rules further includes evaluating the rules and based on the evaluating obtaining an authorization to update the ledger from a resource identified in the rules.

12. A system, comprising:
a server comprising at least one processor and a non-transitory computer-readable storage medium;
the non-transitory computer-readable storage medium comprises server executable instructions;
a managed device comprising at least one managed device processor and a managed device non-transitory computer-readable storage medium;
the managed device non-transitory computer-readable medium comprises managed device executable instructions;
the managed device executable instructions when executed by the at least one managed device processor from the managed device non-transitory computer-readable storage medium cause the at least one managed device processor to perform operations comprising:
receiving a request to generate a code;
dynamically generating the code by encoding a managed device identifier for the managed device and resource identifiers for current installed software and connected peripherals within the code; and
rendering the code on a display of the managed device for scanning by a mobile device operated by a service engineer during a service call to the managed device;
the server executable instructions when executed by the at least one processor from the non-transitory computer-readable storage medium cause the at least one processor to perform second operations comprising:
receiving a service communication from the mobile device;
identifying the code and a current geographical location of the mobile device within the service communication;
decoding the code and obtaining the managed device identifier and the resource identifiers;
associating the current geographical location of the mobile device with the managed device identifier;
obtaining rules associated with an enterprise based on the mobile device identifier; and
updating or adding an entry to a distributed ledger associated with the managed device within a private blockchain using the managed device identifier and an enterprise identifier associated with the enterprise based on the rules, wherein the entry comprises the current geographical location and the resource identifiers.

13. The system of claim 12, wherein the managed device is an Automated Teller Machine (ATM), a Self-Service Terminal (SST), a Point-Of-Sale (POS) terminal, a kiosk, or an Internet-of-Things (IoT) device.

* * * * *